United States Patent [19]
Skop, Jr. et al.

[11] Patent Number: 5,270,540
[45] Date of Patent: Dec. 14, 1993

[54] MONITOR CALIBRATOR HOUSING AND MOUNTING BRACKET

[75] Inventors: Francis R. Skop, Jr., Fairport; Isevy Chernobilsky, Rochester, both of N.Y.

[73] Assignee: Eastman Kodak Company, Rochester, N.Y.

[21] Appl. No.: 855,399

[22] Filed: Mar. 23, 1992

[51] Int. Cl.⁵ .............................................. G06R 9/00
[52] U.S. Cl. ...................................... 250/239; 358/10
[58] Field of Search ...................... 250/239; 356/220; 248/205.1; 358/10

[56] References Cited

U.S. PATENT DOCUMENTS

| | | |
|---|---|---|
| 1,696,483 | 12/1928 | Hiering . |
| 3,401,331 | 9/1968 | Mussulman .................. 324/20 |
| 3,962,722 | 6/1976 | Ciciora ........................ 358/10 |
| 3,984,862 | 10/1976 | Volz ............................ 358/10 |
| 4,254,432 | 3/1981 | Nakahata .................... 358/10 |
| 4,688,079 | 8/1987 | Fendley ....................... 358/10 |
| 4,700,218 | 10/1987 | Thomsen et al. ........... 358/29 |
| 4,746,970 | 5/1988 | Hosokawa et al. ......... 358/29 |
| 4,814,858 | 3/1989 | Mochizuki et al. ......... 358/10 |
| 4,962,305 | 10/1990 | Schorr ......................... 250/239 |

OTHER PUBLICATIONS

Brochure for "Precision Color Calibrator" by Radius; Jan. 1990.
Brochure for "Supermatch" Product by Supermac; Oct. 1990.

*Primary Examiner*—David C. Nelms
*Assistant Examiner*—John R. Lee
*Attorney, Agent, or Firm*—Thomas H. Close; Mark Z. Dudley

[57] ABSTRACT

A monitor calibrator housing and mounting bracket for storing the housing in either the horizontal or vertical positions. The housing includes opposing, side, contoured, finger receptacles, and a suction cup at one end. The mounting bracket includes first and second parts. The first part includes a flat portion and a perpendicular U-shaped portion. The second, separate part is a curved member having a first recess for receiving a curved free end of the flat portion, and a portion of the suction cup, and a second recess for supporting a portion of the housing. When the calibrator is removed from a monitor, it can be placed in the first part, which rests horizontally on e.g., a desk top. In this position, the suction cup rests on the flat portion of the first part. The calibrator and the first mounting bracket can also be placed in the second mounting bracket part, which is removably connected to a vertical surface, such as a CRT side panel.

20 Claims, 6 Drawing Sheets

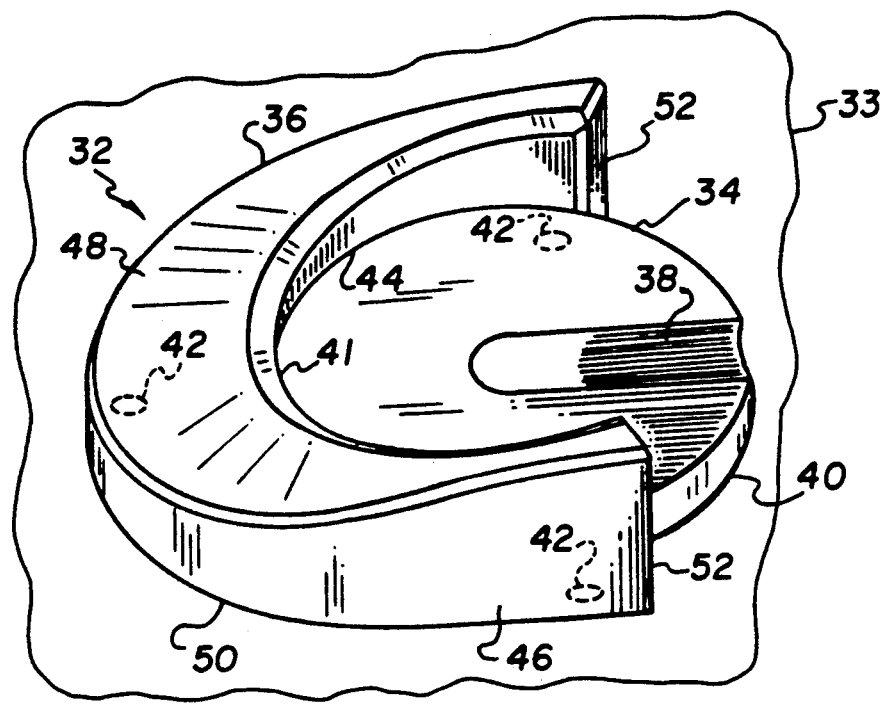
FIG. 3
FIG. 4
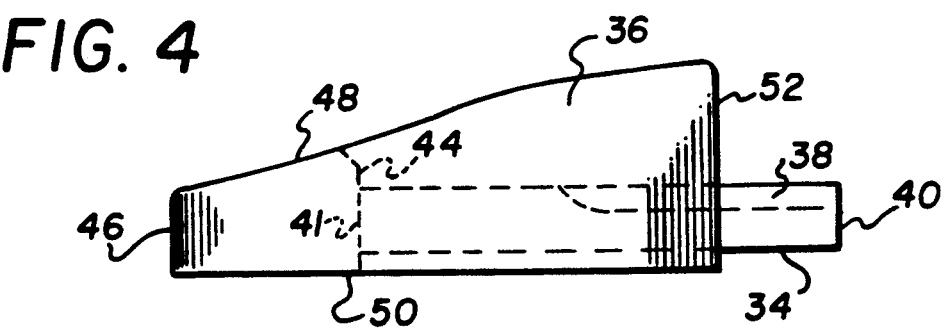

MONITOR CALIBRATOR HOUSING AND MOUNTING BRACKET

BACKGROUND OF THE INVENTION

1. Cross References to Related Applications

This application is related to U.S. Application entitled "CRT Calibrator Unit", having U.S. Ser. No. 07/855,260 and to "Luminance Measurement Method and Apparatus", having U.S. Ser. No. 07/855281 both of which relate to the electronic hardware and software, respectively, associated with the invention described herein, are assigned to Eastman Kodak Co. and are incorporated by reference herein.

2. Field of the Invention

The present invention relates to a precision color management system known as a monitor calibrator and, more particularly, to a monitor calibrator housing in combination with a bracket which conveniently stores the housing.

3. Description of the Related Art

Monitor calibrators are devices used to electronically measure the color characteristics of a cathode ray tube (CRT) or a computer monitor. The calibrators are usually hand-held and are connected to the CRT or computer monitor screen via a suction cup.

Examples of currently available calibrators are the "Precision Color Calibrator" by Radius, Inc., and the "Supermatch" by Supermac Technology. In each case the calibrator housing includes a light sensor. A cable connects the light sensor in the calibrator housing to a separate rectangular pad or member, which houses the electronics for converting the sensed light into some sort of electrical signals. The signals are then sent through another cable to the computer being monitored for processing.

The drawbacks related to these conventional calibrators follow.

When not in use on the CRT screen, these calibrators are usually casually placed on the rectangular member, on a desk or on a top panel of the computer monitor. If the calibrator is placed on its side or over an edge of the rectangular member, desk, or monitor, the precision parts of the calibrator can be exposed to light and dust. Exposure to light and dust deteriorates the effectiveness of the precision calibrator. There currently is no reliable way to conveniently store these devices in a way that protects them from dust and light exposure.

Also, when the calibrator is left on the rectangular member, desk, or computer monitor top, there is a chance that the calibrator may be accidentally hit and knocked to the floor, or otherwise dropped, causing damage to the sensitive electronics in the calibrator.

Current designs for calibrators are not easily used by a single hand. That is, the conventional calibrator housings are either cylindrical or straight sided. Neither is very ergonomic for both holding the housing and releasing the suction cup of the calibrator from the CRT screen with one hand.

Known calibrators use a shaded strip that is formed in the factory to serve as a standard filter. On site, the strip is oriented in the interior of the housing until the calibrator is calibrated via the particular software in the computer associated with the calibrator operation. After the strip is accurately positioned relative to the interior of the housing, the ends are merely cut and the strip is left in the interior. Unfortunately, the strip in the conventional housing can become dislocated during use, especially if dropped as suggested above, thereby rendering inaccurate color readings.

Finally, the rectangular members can only be used on a horizontal surface and therefore take up valuable space at a workstation. This may cause the user to move the rectangular member to an inconvenient position. Also, since the rectangular member houses the electronics for converting the sensed light received by the calibrator housing into electrical signals, which are then sent to a computer for processing, a multi-piece, cumbersome system results, which frustrates potential portability of the system from computer to computer.

SUMMARY OF THE INVENTION

Accordingly, it is a purpose of the present invention to provide a mounting bracket for a monitor calibrator which prevents dust and light from finding its way into the calibrator housing, thereby maintaining the integrity of the calibrator.

It is another purpose of the present invention to provide a mounting bracket for a monitor calibrator which prevents accidental dislocation of and potential damage to the calibrator.

It is another purpose of the present invention to provide a monitor calibrator housing which is more ergonomic for use by a single hand.

It is another purpose of the present invention to provide a calibrator housing including means for converting sensed light into electric signals, to simplify overall design and reduce bulkiness.

It is still another purpose to provide a calibrator housing having means for positively securing a shaded calibration strip in the interior of the housing after the calibrator is calibrated by the strip.

Finally, it is a purpose of the present invention to provide a mounting bracket for a monitor calibrator which allows the calibrator to be conveniently stored in either a vertical or horizontal position, convenient to the user.

To achieve the foregoing and other purposes of the present invention there is provided a housing for a monitor calibrator that is conveniently received by a mounting bracket in either the vertical or horizontal positions. The housing includes contoured finger receptacles on opposite sides thereof, which, when assembled on the housing, fix the shaded strip in place, and a suction cup at one end. The mounting bracket includes first and second parts. The first part includes a flat portion having a curved first free end and a second opposite end having a perpendicular U-shaped portion. The second, separate part is a curved member including a first recess for receiving the curved free end of the flat portion, and a portion of the suction cup, and a second recess for supporting a portion of the housing of the calibrator.

When the calibrator is removed from the CRT, it can be placed in the first part, which rests horizontally on e.g., a desk top. The suction cup of the housing rests against but does not create suction with the flat portion. The U-shaped portion surrounds part of the housing. The calibrator can also be placed in the second mounting bracket part, which is removably connected to a vertical surface, such as a CRT side panel. The first mounting bracket part is then placed onto the second part.

These together with other objects and advantages which will be subsequently apparent, reside in the details of construction and operation as more fully herein-after described and claimed, reference being had to the accompanying drawings forming a part hereof.

BRIEF DESCRIPTION OF THE DRAWINGS

FIG. 3 is a perspective view of the first part of the mounting bracket according to the present invention, in the horizontal position.

FIG. 4 is a left side view of the first part of the mounting bracket shown in FIG. 3.

DESCRIPTION OF THE PREFERRED EMBODIMENTS

Figure 1:
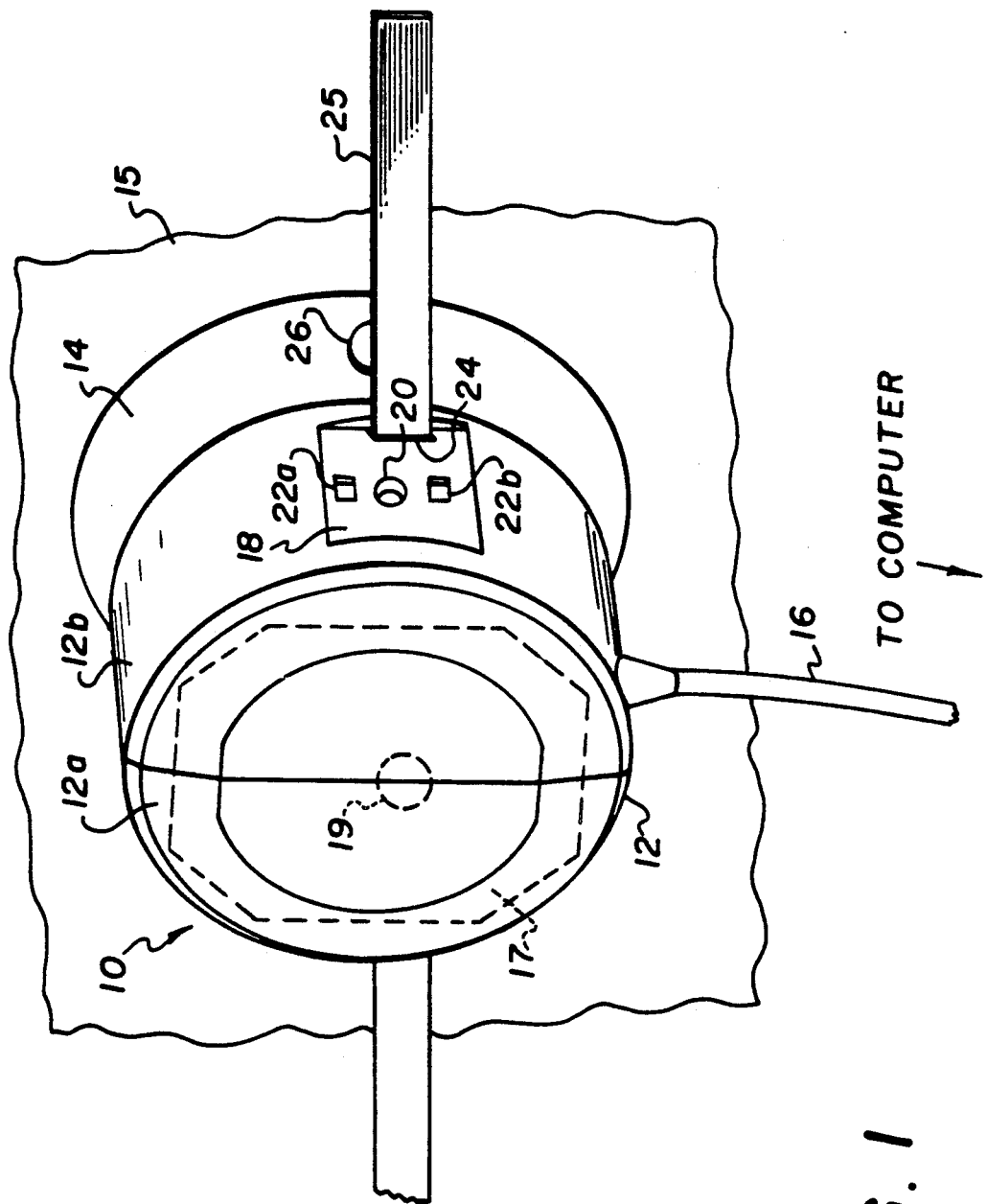
FIG. 1 is a perspective view of the calibrator housing according to the present invention oriented vertically and with the finger receptacles removed.
Figure 2:
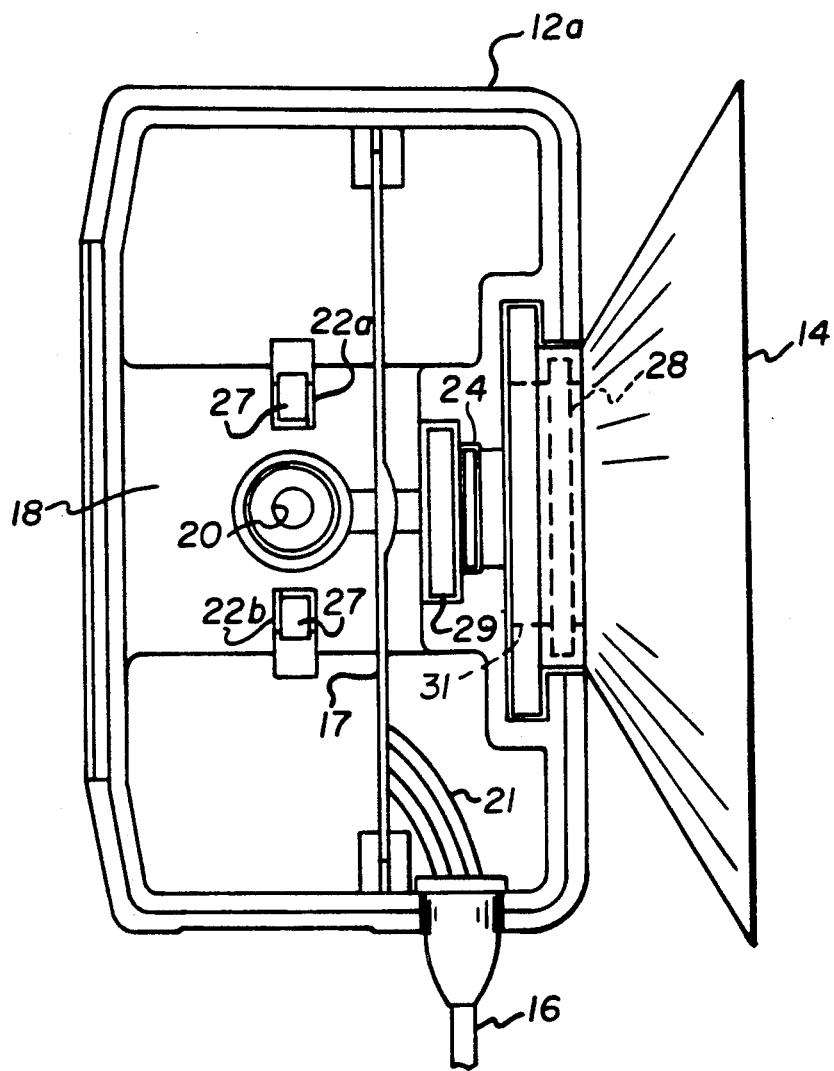
FIG. 2 is a view of the interior of the left side of the housing, and the suction cup.

FIGS. 1 and 2 show the monitor calibrator according to the present invention indicated generally by reference numeral 10. This calibrator 10 includes a housing 12 and a suction cup 14 intended to removably attach the housing 12 to a CRT screen 15. The housing 12 is generally cylindrical for easy manufacturing, although this shape is not mandatory. The housing is preferably made up of a first half 12a and a second half 12b.

As shown particularly in FIG. 2, the suction cup 14 receives in a central opening 31 thereof a clear glass panel 28 which allows light to pass into the interior of the housing 12, but helps to keep dust from entering the interior of the housing 12. Within the housing 12 there is included a square-shaped glass filter 29, a printed circuit board 17 including a light to frequency converter 19 having circuitry for converting the light received in the housing 12 into electrical signals, and means 21 for electrically connecting a cable 16 to the printed circuit board 17. The cable 16 connects to the computer being monitored, which includes particular software for processing the electrical signals.

The electronics of this device are more fully explained in Assignee's co-pending applications referenced above. However, it is to be emphasized herein that, in contrast to the conventional calibrators discussed above, the critical electronics are contained in the calibrator housing, not in a separate but connected rectangular pad or member. In this way, the calibrator of the present invention is more compact, more portable and easier to use.

On a side of each of the halves 12a and 12b of the housing 12, there is located a recess 18 for receiving finger receptacles discussed below. Each recess 18 includes a central hole 20 used for screwing the first and second halves 12a and 12b of the housing 12 together. The recess 18 also includes upper and lower openings 22a and 22b, respectively, which are intended to receive hooked projections 27 extending from the contoured finger receptacles so that the fingered receptacles may be securely attached to the housing 12.

The recess 18 also includes a slit 24 which receives a shaded strip 25 that is formed in the factory to serve as a standard filter for each calibrator. On site, the strip 25 is passed through opposing slits 24 and the interior of the housing 12 until the calibrator 10 is calibrated via the particular software in the computer associated with the calibrator operation.

After passing the strip 25 through the opposing slits 24 to achieve proper calibration, the ends extending out of the slits 24 are cut about ⅛ inch out from the housing 12, leaving enough to be captured under and locked into place by the finger receptacles 54. As stated above, the finger receptacles 54 are assembled on the housing 12 via cooperation of the projections 27 on the finger receptacles 54 and the openings 22a, 22b.

Figure 9:
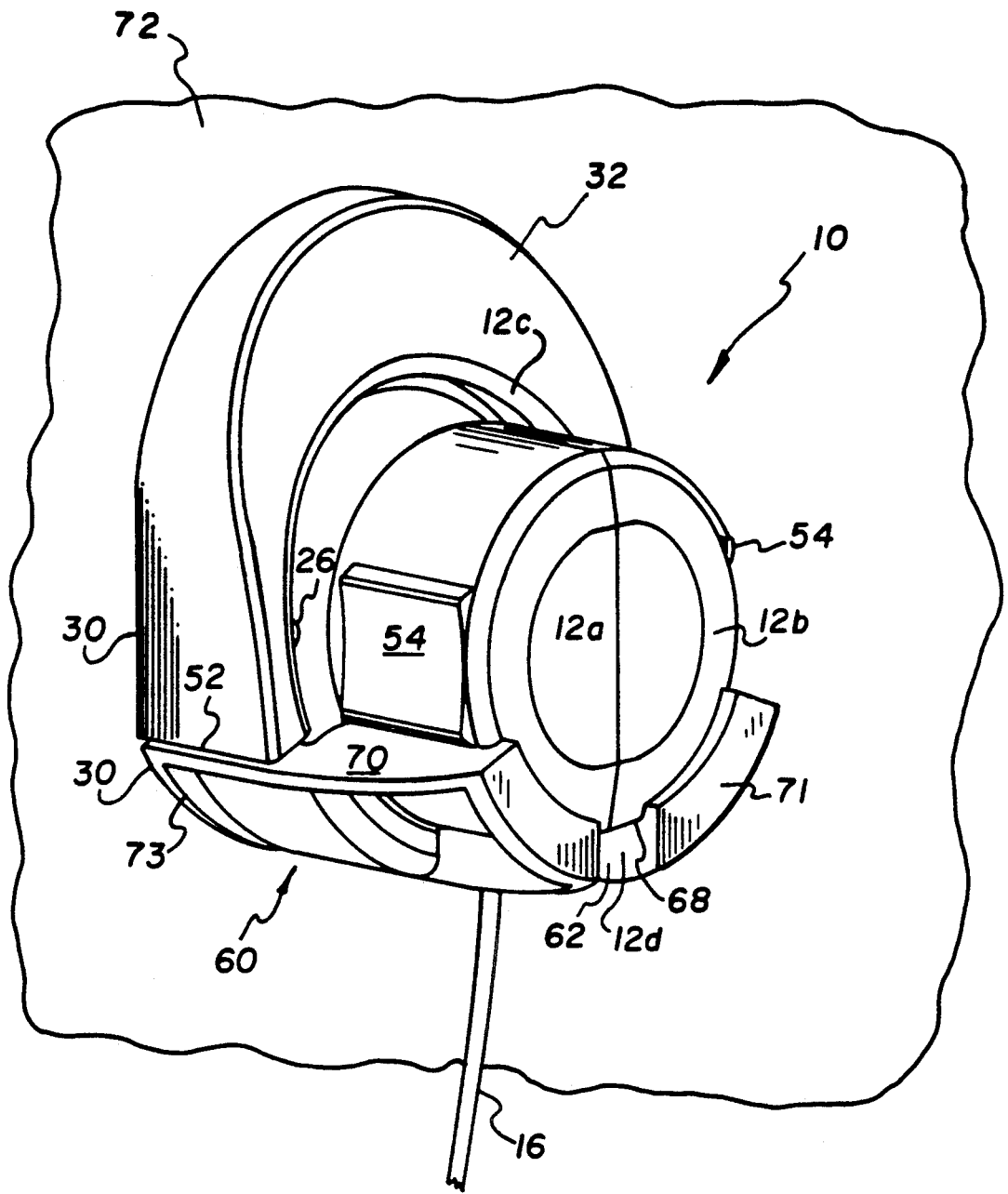
FIG. 9 is a perspective view of the calibrator housing in combination with the mounting bracket, all in the vertical position.

The suction cup 14 is made of a pliable material such as rubber or plastic and includes two diametrically opposed release standoffs 26 (compare FIGS. 1 and 9). The release standoffs 26 facilitate gripping of the suction cup to release suction from the CRT screen 15.

The mounting bracket 30 (FIG. 9) according to the present invention includes first 32 and second 60 separate parts as described below. By using a two-part mounting bracket 30, assembly and disassembly of the bracket, and receipt and removal of the calibrator 10, is facilitated, while production and assembly costs are minimized. This mounting bracket 30 protects the calibrator 10 from damage, such as from light and dust, either in the vertical or horizontal positions, or when the calibrator 10 is being transported.

FIGS. 3 and 4 illustrate particularly the first part 32 of the mounting bracket 30 located on a horizontal surface 33. The first part 32, is preferably made of high-impact plastic.

This first part 32 includes a flat portion 34 having a first free, circular end 40 and a second end 41 which includes a substantially perpendicular U-shaped portion 36.

The flat portion 34 includes a longitudinal, linear recess 38 opening to the free end 40. When the suction cup 14 is placed on the flat portion 34 as discussed below, the linear recess 38 prevents the suction cup 14 from creating suction, thereby facilitating removal of the calibrator 10 from the first part 32.

The flat portion 34 also includes on its underside, a plurality of small rubber projections 42 which help to prevent marring any surface upon which the first part 32 rests.

The U-shaped member 36 includes inner 44 and outer 46 curved walls, a top wall 48, a bottom wall 50, and two end walls 52.

Figure 5:
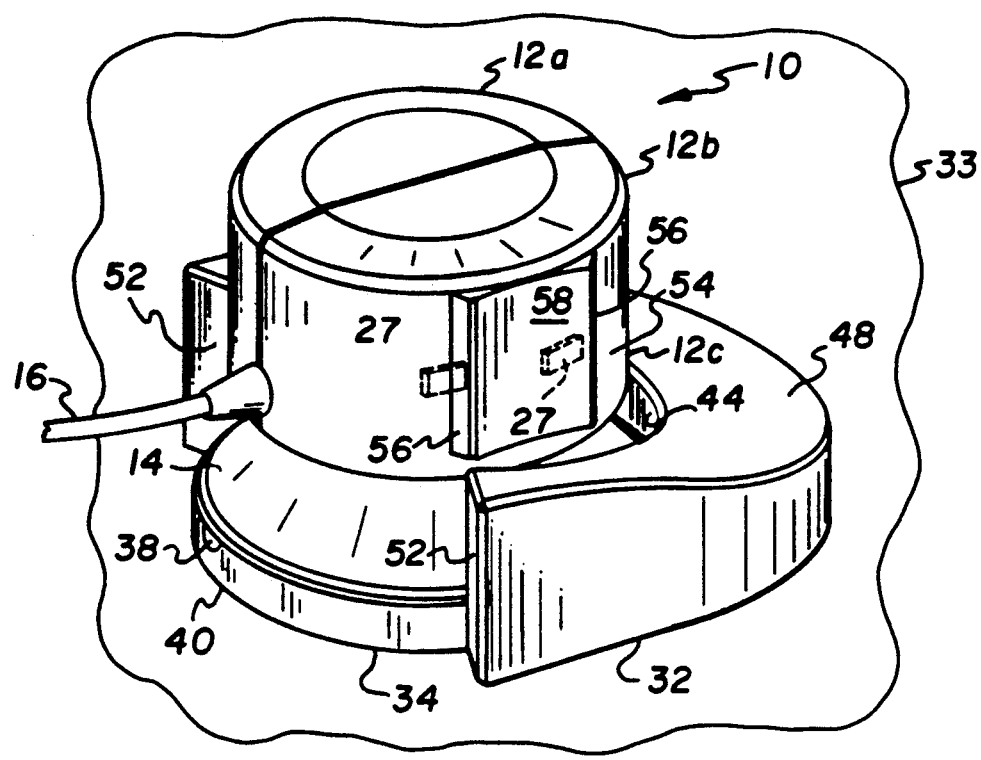
FIG. 5 is a perspective view of the calibrator housing received by the first part of the mounting bracket, both being horizontal.

FIG. 5 illustrates the calibrator 10 inserted in the first part 32 of the mounting bracket 30, while both the calibrator 10 and first part 32 are on the horizontal surface 33 such as a desk top adjacent the CRT.

More particularly, when the calibrator 10 is removed from the CRT screen 15 it can be merely slipped into the first part 32 of the mounting bracket 30 so that the suction cup 14 rests on the flat portion 34 and the U-shaped portion 36 generally surrounds an upper area 12c of the housing 12. In this position, there is little likelihood that dust or light will find its way into the calibrator.

Because the first part 32 of the mounting bracket 30 is not permanently connected to the horizontal surface 33, the first part 32 can be easily moved to anywhere on the horizontal surface, or onto the second part 60 as described below.

FIG. 5 also shows a contoured finger receptacle 54 placed on one of the halves 12b of the housing 12. There is also an identical, diametrically opposed finger receptacle 54 on the other half 12a, so only one is discussed further herein.

As can be seen, this finger receptacle 54 includes two opposing, side angled walls 56 between which is formed a concave surface 58. This design facilitates reception of the housing 12 by a thumb and index finger of a single hand, thereby fostering manipulation of the calibrator 10 using only a single hand. Using the contoured finger receptacles 54, the user can easily and reliably move the calibrator 10 to and from the CRT screen 15 and mounting bracket 30, using one hand. The concaveshaped receptacles 54 also lead the fingers to the release standoffs 26 for easy release of the suction cup 14 from the CRT screen.

Figure 6:
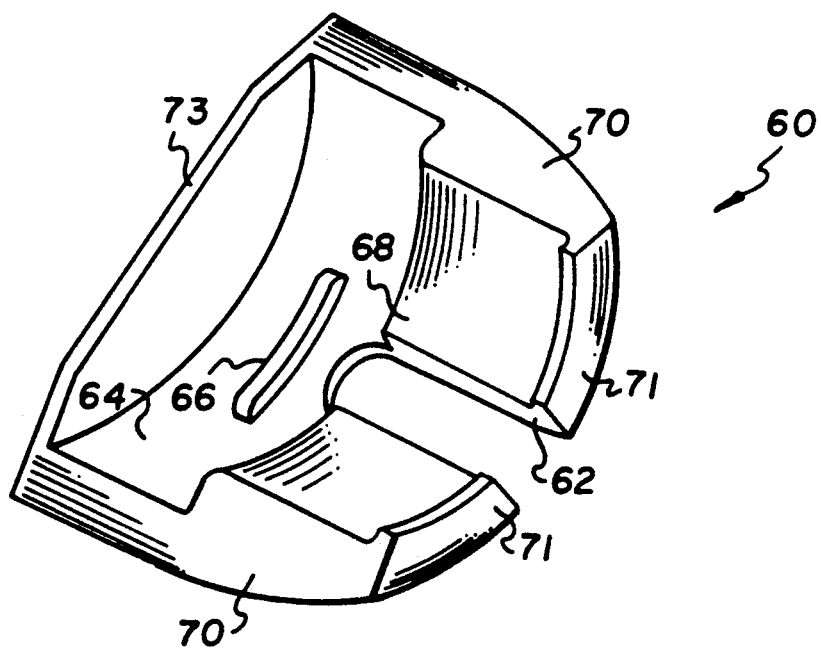
FIG. 6 is a perspective view of the second part of the mounting bracket according to the present invention.
Figure 7:
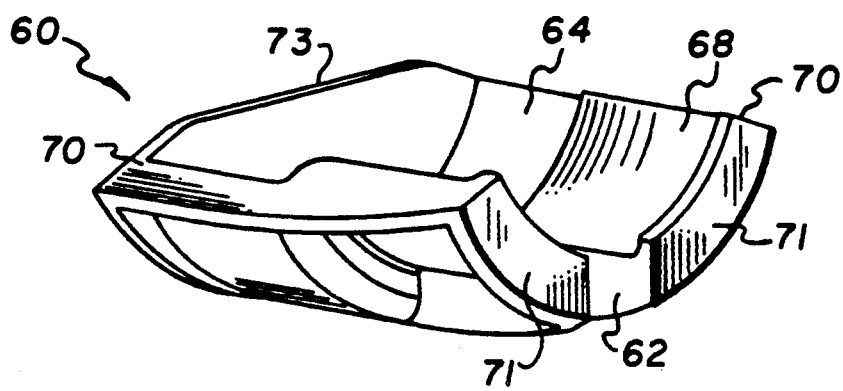
FIG. 7 is another perspective view of the second part.
Figure 8:
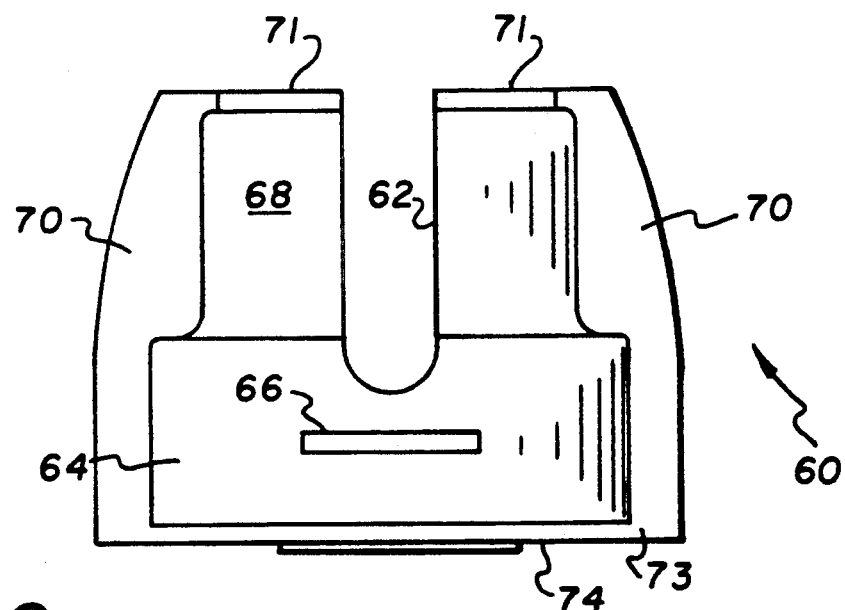
FIG. 8 is a top view of the second part.

FIGS. 6–8 illustrate the second part 60 of the mounting bracket, which is a curved member. Within the second part 60 there is formed a channel 62 which is intended to loosely receive the cable 16 as described below.

The second part 60 also includes a first curved recess 64 having a centrally located rib 66. The rib separates the curved recess 64 into two portions, the rearmost of which is intended to receive the curved, free end 40 of the flat portion 34, and the forwardmost of which is intended to receive a portion of the suction cup 14 of the calibrator 10. The second part 60 also includes a second recess 68 formed adjacent the first curved recess 64 which is intended to receive a lower area 12d of the housing 12. Finally, upper walls 70 span the respective recesses 64, 68. Front 71 and rear walls 73 are also provided.

FIG. 9 illustrates the combination of the calibrator 10 and the mounting bracket 30 according to the present invention. As shown, the rear wall 73 of the second part 60 is attached to a vertical surface 72 such as a CRT side panel, by connecting means 74 (FIG. 8), preferably double-sided, adhesive tape. Alternate means 74 of connecting the second part 60 can be used, such as suction cups or Velcro ®, etc. Magnetic strips should not be used due to the sensitive nature of the computer memory storage devices and/or non-magnetic material of the cabinetry.

The calibrator 10 is placed in the second part 60 such that the suction cup 14 is received by the first recess 64 formed in the second part 60. Further, the lower area 12d of the housing 12 is supported by the second recess 68 of the second part 60. The first part 32 is positioned over the calibrator 10 such that the curved free end 40 is received by the first recess 64 and walls 52 of the first part 32 abut the walls 70 of the second part 60. Also, the suction cup 14 faces the flat portion 34 of the first part 32. The contoured finger receptacles 54 are clearly visible and easily accessible when in the mounting bracket 30.

Finally, the entire combination shown in FIG. 5, or either bracket part 32 and the housing 12, can be moved to another computer workstation, where the cable 16 is merely plugged into the new computer. There is no need for any bulky additional rectangular member or pad, as required by the prior art, and yet the mounting bracket 30 serves to protect the calibrator housing 12 at the new location just as described above. As such, this invention also provides a convenient and safe way to transport the calibrator 10 from workstation to workstation.

Although specific shapes of the housing 12 and bracket parts 32 and 60 are shown in the drawings, these shapes are merely exemplary. What is important is that the housing be easily hand manipulated and that the bracket parts 32, 60 receive in protective and portable fashion the housing 12.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A combination calibrator and mounting bracket, comprising:
   (a) a housing for the calibrator;
   (b) a mounting bracket for removably receiving the housing horizontally and vertically; the mounting bracket having
      (i) a first part for being positioned on a horizontal surface; and
      (ii) a second part for being positioned on a vertical surface.

2. The combination as recited in claim 1, wherein the housing comprises contoured means for receiving fingers of one hand of the user.

3. The combination as recited in claim 1, wherein the contoured means comprises a pair of concave members, each positioned opposite the other on the housing.

4. The combination as recited in claim 2, wherein the contoured means includes projections engageable with openings in the housing to connect the contoured means to the housing.

5. The combination as recited in claim 1, wherein the housing comprises slit means for passing a calibration strip with two ends through the housing.

6. The combination as recited in claim 5, wherein the housing further comprises contoured means for receiving fingers of one hand of the user.

7. The combination as recited in claim 6, wherein the contoured means includes projections engageable with openings in the housing formed adjacent the slit means to connect the contoured means to the housing and fix the two ends of the calibration strip to the housing.

8. The combination as recited in claim 2, wherein the housing includes a cylindrical portion and a suction cup attached to an end of the cylindrical portion.

9. The combination as recited in claim 8, wherein the first part comprises a flat portion for receiving the suction cup, a first, curved free end, and a second end having a substantially perpendicular U-shaped portion which is connected to the flat portion.

10. The combination as recited in claim 9, wherein the second part comprises a curved member including a first recess for receiving the first, free end of the first part and a portion of the suction cup, and a second recess for supporting a portion of the housing.

11. The combination as recited in claim 9, wherein the suction cup comprises release standoffs formed on opposite sides thereof to facilitate release of suction of the suction cup.

12. The combination as recited in claim 9, further comprising a cable extending from the housing for connection to computing means.

13. The combination as recited in claim 12, wherein the second part further comprises an opening to receive the cable, when the housing is received by the second part.

14. The combination as recited in claim 1, wherein the second part, when positioned vertically, receives the first part and the housing.

15. The combination as recited in claim 1, wherein the housing comprises means for converting light received by the calibrator into electrical signals.

16. The combination as recited in claim 1, wherein the first part, when positioned horizontally, receives the housing.

17. The combination as recited in claim 9 wherein the flat portion includes a recess to prevent suction when the flat portion receives the suction cup.

18. A device for storing a calibrator housing, the calibrator having a suction cup, comprising:

a mounting bracket for removably receiving the housing horizontally and vertically, including
(i) a first part for being positioned on a horizontal surface; and
(ii) a second part for being positioned on a vertical surface,
wherein the first part, when positioned horizontally, receives the housing, and
wherein the second part, when positioned vertically, receives the first part and the housing.

19. The combination as recited in claim 18, wherein the first part comprises a flat portion for receiving the suction cup, a first curved free end, and a second end having a substantially perpendicular U-shaped portion which is connected to the flat portion.

20. The combination as recited in claim 19, wherein the second part comprises a curved member including a first recess for receiving the first, free end of the first part and a portion of the suction cup, and a second recess for supporting a portion of the housing.

* * * * *